US008902485B2

(12) United States Patent
Bird et al.

(10) Patent No.: US 8,902,485 B2
(45) Date of Patent: Dec. 2, 2014

(54) CONTRAST ENHANCING SYSTEM

(71) Applicants: Mark Bird, Waterloo (CA); John Domm, Kitchener (CA)

(72) Inventors: Mark Bird, Waterloo (CA); John Domm, Kitchener (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 195 days.

(21) Appl. No.: 13/688,768

(22) Filed: Nov. 29, 2012

(65) Prior Publication Data

US 2014/0146377 A1    May 29, 2014

(51) Int. Cl.
| | |
|---|---|
| G02B 26/08 | (2006.01) |
| H04N 9/31 | (2006.01) |
| G03B 21/20 | (2006.01) |
| G02B 27/09 | (2006.01) |

(52) U.S. Cl.
CPC .............. *G02B 26/08* (2013.01); *H04N 9/315* (2013.01); *G03B 21/208* (2013.01); *G02B 27/09* (2013.01); *G02B 27/0994* (2013.01)
USPC ......................... 359/201.2; 359/225.1; 353/34

(58) Field of Classification Search
CPC ... H04N 9/3197; H04N 9/315; G02B 27/283; G02B 13/22; G03F 7/70325
USPC ..................... 359/196.1–201.2, 212.1–215.1, 359/223.1–226.2
See application file for complete search history.

(56) References Cited

U.S. PATENT DOCUMENTS

| | | | |
|---|---|---|---|
| 6,139,157 A | 10/2000 | Okuyama | |
| 2002/0044261 A1* | 4/2002 | Ouchi et al. | .................... 353/31 |
| 2002/0140911 A1 | 10/2002 | Peterson | |
| 2003/0107714 A1 | 6/2003 | Cheng | |
| 2004/0218152 A1 | 11/2004 | Jung | |
| 2007/0217013 A1 | 9/2007 | Schuster | |
| 2012/0194748 A1 | 8/2012 | Kakuta | |

FOREIGN PATENT DOCUMENTS

WO     2012139634 A1    10/2012

OTHER PUBLICATIONS

Corresponding European Patent Application No. 13250114.9 Search Report dated Mar. 10, 2014.

* cited by examiner

*Primary Examiner* — James Phan
(74) *Attorney, Agent, or Firm* — Perry + Currier, Inc.

(57) ABSTRACT

A contrast enhancing system is provided comprising: a digital micromirror device (DMD); a light source; a first integrator that receives light from the light source, comprising lateral long and short dimensions, the lateral short dimension at a non-zero angle to the DMD tilt axis; a second integrator that receives and shapes light from the first integrator; a telecentric lens about midway between the integrators that generates fast and slow f-number directions of the light in angle space, respectively corresponding to the lateral long and short dimensions of the first integrator, the slow f-number direction correspondingly at the non-zero angle to the DMD tilt axis, thereby increasing dead-zones between adjacent ones of a DMD illumination path and DMD reflection paths for each of the on, flat and off-state positions; and, at least one optical component that focuses the light along the illumination path from the second integrator onto the DMD.

13 Claims, 10 Drawing Sheets

CONTRAST ENHANCING SYSTEM

FIELD

The specification relates generally to projection systems, and specifically to a contrast enhancing system for use in a projection system.

BACKGROUND

Digital micromirror device (DMD based projectors currently suffer from poor contrast and/or uniformity when angles between illumination light, flat-state light, on-state light and off-state light are not well-controlled. Each micromirror pivots between an on-state and an off-state, and is generally in an intermediate flat state for about 1% of the time. For example, in some DMD devices, micromirrors pivot between +/−12° and is in a flat state when not at +/−12°, and is sitting flat, but is significant enough to affect contrast.

SUMMARY

An aspect of the specification provides a contrast enhancing system comprising: a digital micromirror device (DMD) comprising a plurality of micromirrors and a tilt axis, the micromirrors enabled to pivot along the tilt axis between an on-state position, a flat-state position, and an off-state position; a light source; a first integrator enabled to receive light from the light source, the first integrator comprising a lateral long dimension and a lateral short dimension, the lateral short dimension at a non-zero angle to the tilt axis of the DMD; a second integrator enabled to receive light from the first integrator, and shape the light into a similar shape as the DMD; a telecentric lens about midway between the first integrator and the second integrator, the telecentric lens enabled to: convey the light from the first integrator to the second integrator; and generate a fast f-number direction and a slow f-number direction of the light in angle space, the fast f-number direction and the slow f-number direction respectively corresponding to the lateral long dimension and lateral short dimension of the first integrator, the slow f-number direction correspondingly at the non-zero angle to the tilt axis, thereby increasing dead-zones between adjacent ones of an illumination path of the light as it impinges on the DMD and reflection paths of the light as it reflects from the micromirrors in each of the on-state position, the flat-state position, and the off-state position; and, at least one optical component enabled to focus the light along the illumination path from the second integrator onto the DMD.

The lateral short dimension of the first integrator can be at about 90° to the tilt axis.

The lateral short dimension can be greater than or about equal to 45° to the tilt axis.

Each of the micromirrors is enabled to: reflect the light to projection optics in the on-state position; and, reflect the light to a light dump in the off-state position.

The contrast enhancing system can further comprise, the light dump.

The dead-zones between adjacent ones of an illumination path of the light as it impinges on the DMD and reflection paths of the light as it reflects from the micromirrors in each of the on-state position, the flat-state position, and the off-state position are increased relative to if the light were f-number symmetric when impinging on the DMD.

A cross-section of the first integrator can be one of rectangular shaped, rounded rectangular shaped, oval shaped, and elliptically shaped.

Each of an exit face of the first integrator and an entrance face of the second integrator can be located at respective focal points of the telecentric lens, each of the respective focal points located on opposite sides of the telecentric lens.

The contrast enhancing system can further comprise a given angle between the tilt axis of the micromirrors and a given edge of the DMD, and the first integrator can be rotated with respect to the second integrator by the given angle, such that the given angle is also between the fast axis of the first integrator and an edge of the second integrator aligned with the given edge of the DMD.

The telecentric lens can be further enabled to convey the light from the first integrator to the second integrator such that the light is contained within boundaries of an entrance face of the second integrator.

Each of the first integrator and the second integrator can comprise one or more of a solid integrator rod and a hollow integrator rod.

The at least one optical component can comprise one or more of a prism, a lens, a prism system, a lens system.

One or more of entrance faces and exit faces of the first integrator and the second integrator, the telecentric lens, and optical surfaces in the at least one optical component can comprise respective anti-reflective coatings.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
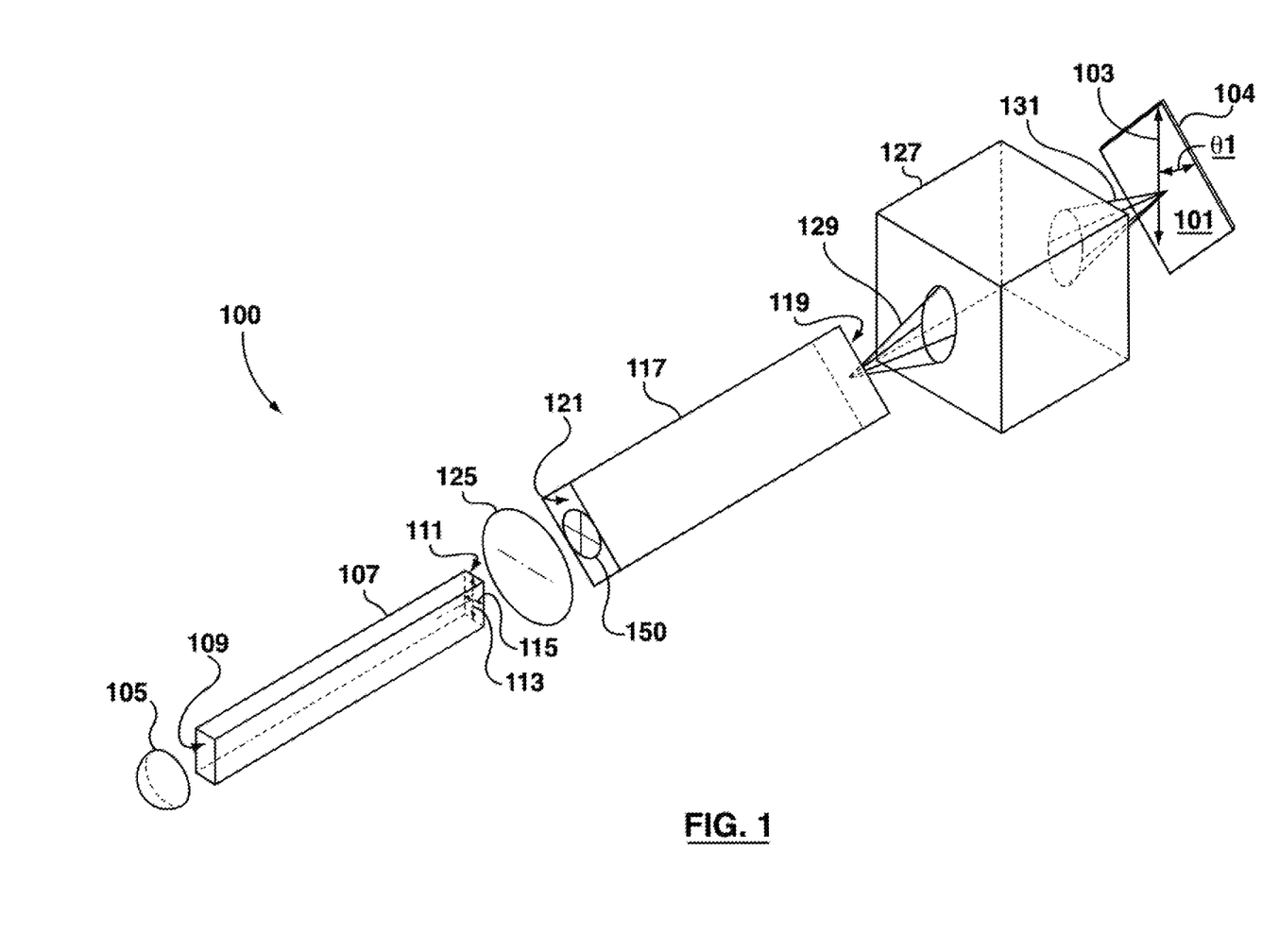
FIG. 1 depicts a perspective view of a contrast enhancing system for use in a projection system, according to non-limiting implementations.

FIG. 1 depicts, respectively, a perspective view of a contrast enhancing system 100, according to non-limiting implementations. System 100 comprises: a digital micromirror device (DMD) 101 comprising a plurality of micromirrors (not depicted, but see FIG. 6) and a tilt axis 103, the micromirrors enabled to pivot along tilt axis 103 between an on-state position, a flat-state position, and an off-state position, as described below with respect to FIG. 6. In specific non-limiting implementations, DMD 101 is rectangular and further comprises a long edge 104, which forms a given angle θ1 with tilt axis 103. System 100 further comprises: a light source 105, including, but not limited to, an elliptical lamp, a laser light source, and the like. System 100 further comprises a first integrator 107 comprising an entrance face 109 and an exit face 111. First integrator 107 is enabled to receive light from light source 105, and further comprises a lateral long dimension 113 and a lateral short dimension 115. It is appreciated that although the terms "long" and "short" are relative terms, in the context of present implementations, lateral short dimension 115 is shorter than lateral long dimension 113 and hence lateral long dimension 113 is longer than lateral short dimension 115: in other words, the terms "long" and "short" in these terms are appreciated to mean the length of each of dimensions 113, 115 relative to each other.

It is yet further appreciated that in present implementations, as a cross-section of first integrator 107 is rectangular, lateral short dimension 115 is at about 90° to lateral long dimension 113, However, in other implementations, lateral short dimension 115 can be less and/or more than 90° to lateral long dimension 113. Furthermore, a cross-section of first integrator 107 can be one of rectangular shaped, rounded rectangular shaped, oval shaped, and elliptically shaped.

Furthermore, lateral short dimension 115 is generally appreciated to be at a non-zero angle to tilt axis 103 of DMD 101. For example, in depicted implementations, lateral short dimension 115 is at about 90° to tilt axis 103 (and lateral long dimension 113 is at about 0° to tilt axis 103). However, in other implementations (for example see FIGS. 9 and 10, described below), lateral short dimension 115 can be about 45° to tilt axis 103. However, in yet further implementations, lateral short dimension 115 can be greater than or about equal to 45°. In yet further implementations, later short dimension 115 can be greater than 0° to tilt axis 103a.

While not depicted, it is further appreciated that system 100 can comprise optical devices (e.g. one or more lenses, and the like) for conveying light from light source 105 to first integrator 107.

System 100 further comprises: a second integrator 117 comprising an exit face 119 and an entrance face 121. Second integrator 117 is enabled to receive light from first integrator 107, and shape the light in physical space into a similar shape as DMD 101. In other words, light enters entrance face 121 and exit face 119, and exit face 119 has a similar aspect ratio as DMD 101. Furthermore, exit face 119 is aligned with DMD 101.

It is let further appreciated that first integrator 107 and second integrator 117 are longitudinally aligned such that light exit face 111 of first integrator 107 enters entrance face 121 of second integrator.

System 100 further comprises: a telecentric lens 125 about midway between first integrator 107 and second integrator 117, telecentric lens 125 enabled to: convey light from first integrator 107 to second integrator 117; and, generate a fast f-number direction and a slow f-number direction of the light in angle space, the fast f-number direction and the slow f-number direction respectively corresponding to lateral long dimension 113 and lateral short dimension 115 of first integrator 107, the slow f-number direction correspondingly at the non-zero angle to tilt axis 103. These concepts are described below in further detail with regard to FIGS. 2 and 3.

It is yet further appreciated that while only one telecentric lens 125 is depicted, the term "lens" is not so limiting; hence, telecentric lens 125 can comprise one or more lenses and/or optical components and/or a plurality of lenses and/or optical components. In any event, as will be explained below with respect to FIG. 6, the shaping of the light from light source 105 by the combination of first integrator 107, telecentric lens 125 and second integrator 117 results in increasing deadzones between adjacent ones of an illumination path of the light as it impinges on DMD 101 and reflection paths of the light as it reflects from the micromirrors in each of the on-state position, the flat-state position, and the off-state position.

System 100 further comprises at least one optical component 127 enabled to focus the light along the illumination path from second integrator 117 onto DMD 101. At least one optical component 127 can comprise one or more of a prism, a lens, a prism system, a lens system and a combination thereof. In some implementations, at least one optical component 127 can further combine light from different light sources and/or different integrator systems and focus/convey the light to DMD 101.

It is further appreciated that one or more of entrance faces 109, 121 exit faces 111, 119, telecentric lens 125, and/or any optical surfaces in at least one optical component 127 can comprise an anti-reflective coating to reduce reflections in system 100 and increase optical throughput.

In any event, light exits exit face 119 of second integrator 117, and is received by at least one optical component 127 which focuses the light onto DMD 101.

It is further appreciated that FIG. 1 depicts a light path 129 of light in angle space as it exits second integrator 117, and a light path 131 of light in angle space as the light is focussed onto DMD 101. Indeed, it is appreciated that, in light paths 129, 131 are oval shaped in a lateral cross-section in angle space, the long dimension of the oval corresponding to a fast f-number direction of the light and the short dimension of the oval corresponding to a slow f-number direction of the light, each of which in turn correspond to the lateral long dimension 113 and lateral short dimension 115 of first integrator 107, as best appreciated from FIGS. 3 and 2, respectively.

It is let further appreciated that light source 105, first integrator 107, second integrator 117, and at least one optical component 127 are longitudinally aligned along a longitudinal axis of system 100 such that light from light source 105 enters entrance face 109, travels through first integrator 107, exits exit face 111, impinges on telecentric lens 125, which shapes the light in angle space as described above, and conveys the light to entrance face 121 of second integrator 117.

It is further appreciated that telecentric lens 125 is further enabled to convey the light from first integrator 107 to second integrator 117 such that the light is contained within boundaries of entrance face 121 of second integrator 117. In other words, as best seen in FIG. 1, in physical space, the light appears as a round spot 150 contained within the boundaries of entrance face 121. It is yet further appreciated that each of exit face 111 and entrance face 121 are located at respective focal points of telecentric lens 125: in other words, telecentric lens 125 comprises two focal points on opposite sides of telecentric lens 125, and each of exit face 111 and entrance face 121 are located at respective focal points of telecentric lens 125 on opposite sides of telecentric lens 125.

In any event, the light then travels through second integrator 117 and exits exit face 119, shaping the light in physical space into a similar shape as DMD 101. While light path 129 in angle space is depicted as an oval in lateral cross-section, it is appreciated that, in physical space, the light is rectangular with a similar aspect ratio as DMD 101, and though with an asymmetric etendue, as represented by light path 129. In any event, light exiting exit face 119 is received by at least one optical component 127 and focussed on DMD 101.

It is further appreciated that DMD 101 is at an angle to at least one optical component 127 such that light is reflected off to a side of system 100, for example to projection optics (see FIG. 6) when a micromirror is an on-state position and/or to a light dump when a micromirror is in an off-state position and/or a flat-state position. The angle of DMD 101 is best appreciated from FIG. 2, described further below. In some implementations, DMD 101 is at about a 24° angle to a longitudinal axis of one or more of system 100 and integrators 107, 117: in other words, DMD 101 is at about twice the angle through which a micromirror pivots from the flat state to the on-state position or the off-state position (e.g. micromirrors pivot between +/−12°.

Further, each of first integrator 107 and second integrator 117 can comprise one or more of a solid integrator rod and a hollow integrator rod, for example with mirrored interior surfaces.

In example non-limiting implementations depicted in FIG. 1, DMD 101 is rectangular, and in particular non-limiting implementations, has an aspect ratio of about 16:9. However, present implementations are not so limiting and indeed DMD 101 can comprise any suitable shape and/or aspect ratio. For example, DMD 101 could also be about square. Hence, it is further appreciated that alignment of second integrator 117 with DMD 101 can be described as a centre of respective exit face 119 being generally aligned with centre of DMD 101, and with a rotation of each about a longitudinal axis of system 100 being similar. However, it is further appreciated that DMD 101 is also tilted laterally with respect to, for example, exit face 119.

Further, each of first integrator 107 and second integrator 117 comprise cross-sections which are similar to shapes of respective exit faces 111, 119, however in other implementations, respective cross-sections of each of first integrator 107 and second integrator 117 can vary. For example, in some implementations, respective cross-sections of each of first integrator 107 and second integrator 117 can taper towards respective exit faces 111, 119.

Figure 2:
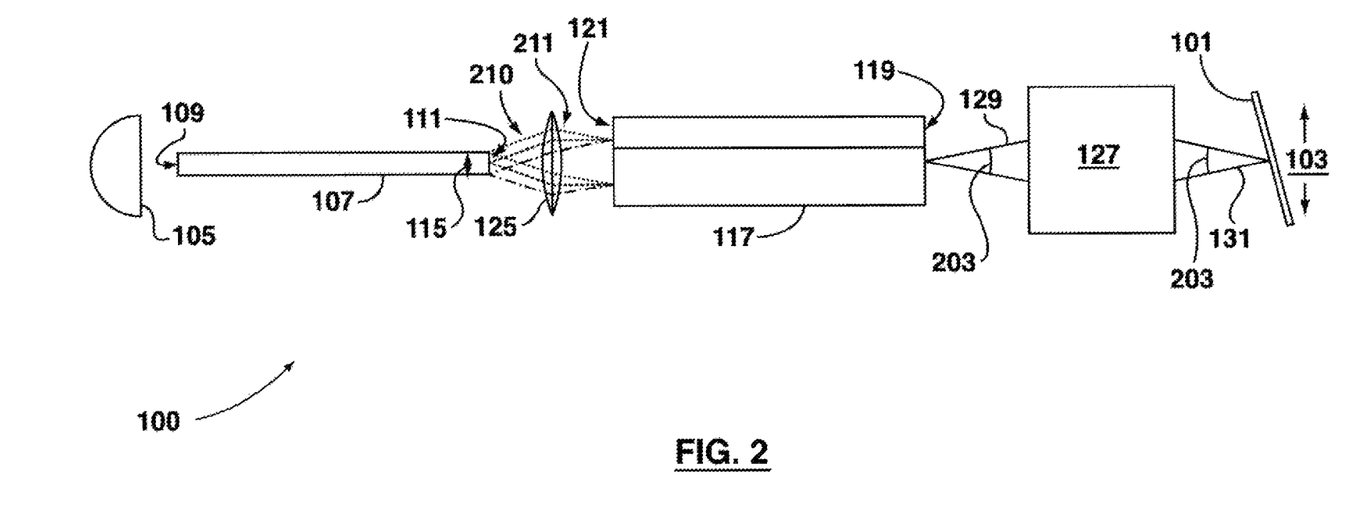
FIG. 2 depicts a top view of the system of FIG. 1, according to non-limiting implementations.
Figure 3:
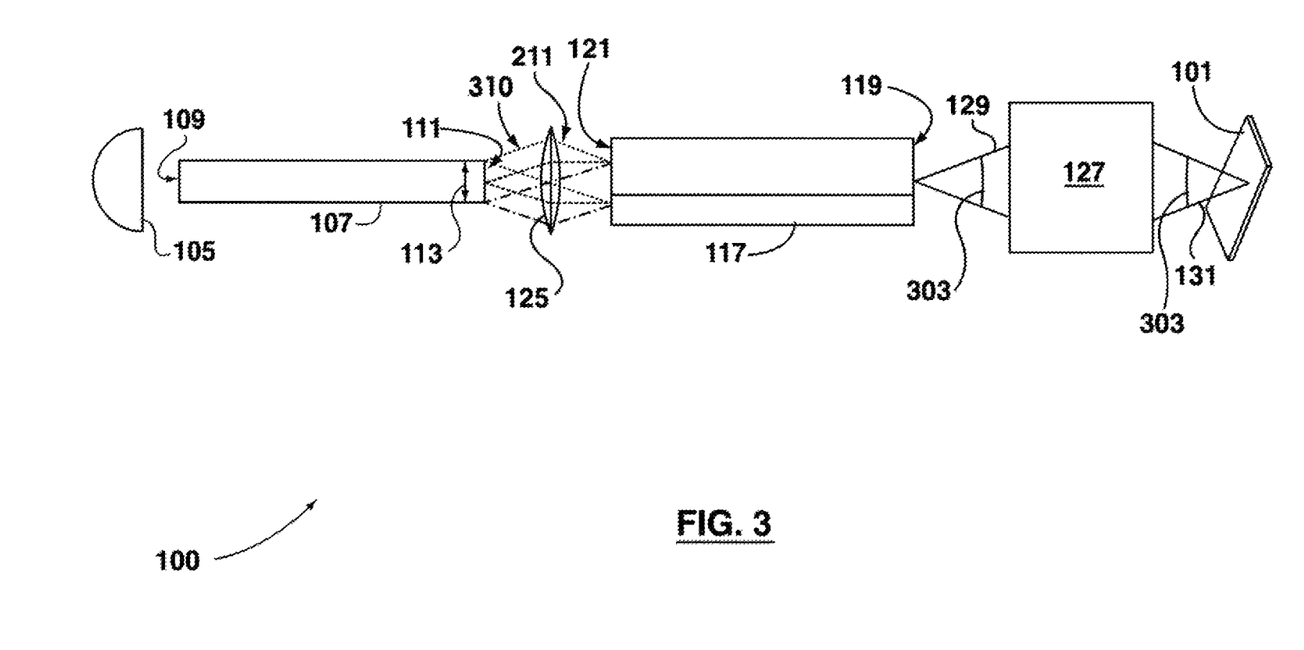
FIG. 3 depicts a top view of the system of FIG. 1, according to non-limiting implementations.

Attention is next directed to FIGS. 2 and 3, which respectively depicts top and side views of system 100, with like elements having like numbers. FIG. 2 further depicts light rays 210 exiting exit face 111 and impinging on telecentric lens 125 along lateral short dimension 115, and corresponding light rays 211 after being refracted by telecentric lens 125. Similarly, FIG. 3 further depicts light rays 310 exiting exit face 111 and impinging on telecentric lens 125 a lateral long dimension 113, and corresponding light rays 311 after being refracted by telecentric lens 125.

It is appreciated that in each of light rays 210, 310 have the same f-number, but that light rays 210 are laterally spread out in a physically smaller dimension that light rays 310 due to lateral long dimension 113 being longer than later short dimension 115. Hence, light rays 210 exiting from the sides of exit face 111, a lateral short dimension 115, are refracted by telecentric lens 125 at a smaller angle than light rays 310 exiting from the sides of exit face 111, a lateral long dimension 113. This results in a light rays 310 having a faster f-number than light rays 210 in angle space. Hence, by using a laterally asymmetric light integrator 107 combined with telecentric lens 125, light exiting first integrator 107 can be shaped into light having an asymmetric f-number profile in angle space.

Further, the asymmetric f-number profile is maintained as the light travels through second integrator 117 and at least one optical component 127. Indeed, this can be appreciated from light paths 129, 131 in angle space each comprising asymmetric cones. As described above, second integrator 117 further shapes light path 129 in physical space into an aspect ratio similar to that of DMD 101, as respective exit face 119 has an aspect ratio similar to that of DMD 101. Hence, light path 129 is generally not conical as depicted in physical space; rather light paths 129, 131 of the light is depicted as asymmetric cones to illustrate the asymmetric nature of the f-number profile of the light.

Figure 4:
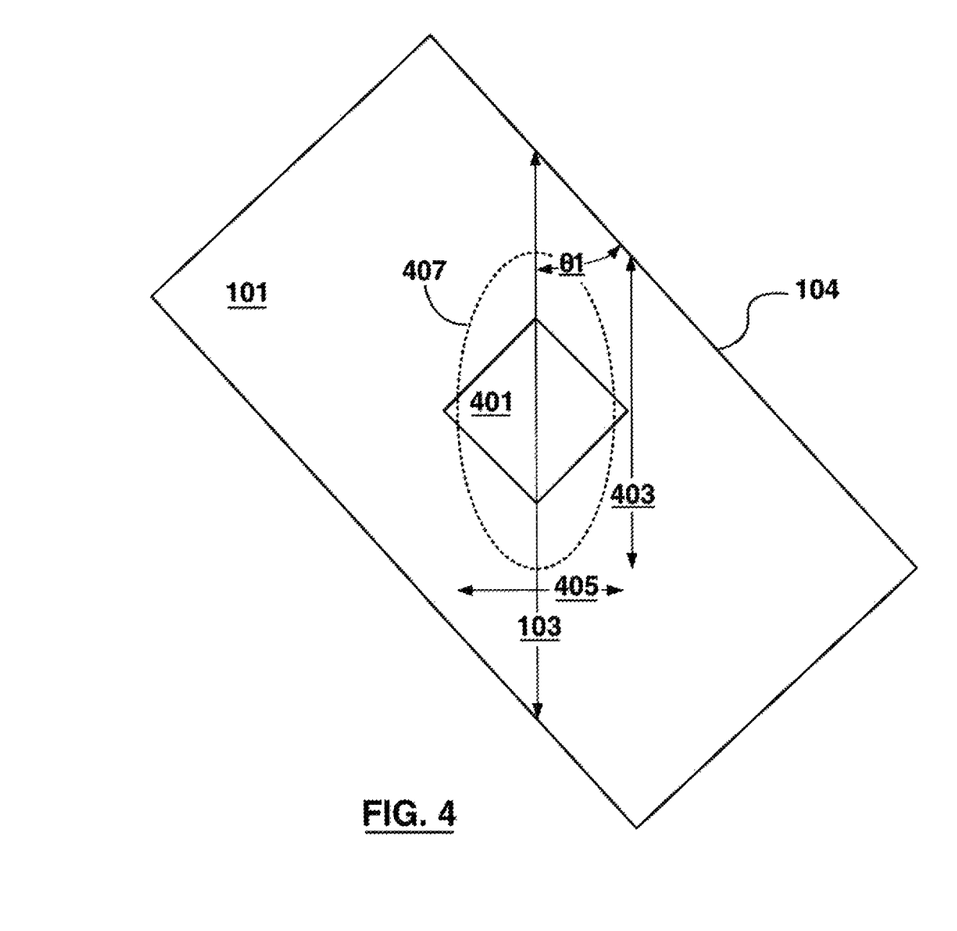
FIG. 4 depicts a front view of a digital micromirror device (DMD) of the system of FIG. 1, according to non-limiting implementations.

Attention is next directed to FIG. 4, which depicts DMD 101, an example micromirror 401, and fast f-number direction 403 and slow f-number direction 405 of a cross-section 407 of an illumination path of light in angle space (e.g. light path 131). While an area of micromirror 401 is depicted as large as compared to an area of DMD 101, it is appreciated that micromirrors of DMD 101 are much smaller than DMD 101; indeed, DMD 101 can comprise thousands to millions of micromirrors, depending on the resolution of DMD 101. Rather, the area of micromirror 401 is exaggerated in FIG. 4 merely to illustrate relationships between micromirrors of DMD 101, tilt axis 103 and long edge 104 (and/or sides of DMD 101).

Micromirror 401 (and indeed all micromirrors of DMD 101) is generally oriented along tilt axis 103. In other words, micromirror 401 pivots between an on-state position, a flat state, and an off-state position (as further described below with reference to FIG. 6) along tilt axis 103. For example, with specific reference to FIG. 4, micromirror 401 will pivot from left to right for one of the on-state position and the off-state position, and right to left for the other of the on-state position and the off-state position. Further, micromirror 401 will be in the flat-state position when not pivoted.

Furthermore, as described, above tilt axis 103 of micromirror 401 forms a given angle θ1 with long edge 104 of DMD 101. In specific non-limiting implementations, tilt axis 103 forms an angle of about 45° with long edge 104, and/or a long side of DMD 101. It is further appreciated that fast f-number direction 403 of focussed illumination light, along light path 131, is aligned with tilt axis 103, while slow f-number direction 405 is about perpendicular (i.e. about 90° to tilt axis 103).

Figure 5:
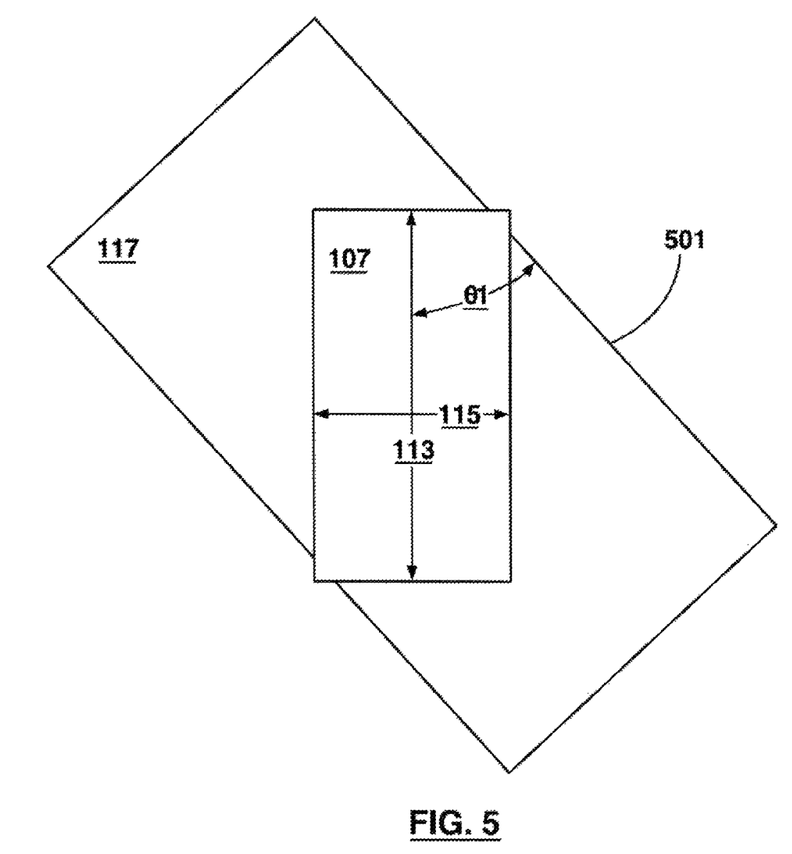
FIG. 5 depicts an end view of integrators of the system of FIG. 1, according to non-limiting implementations.

Attention is next directed to FIG. 5, which depicts an end view of first integrator 107 and second integrator 117, as well as lateral long dimension 113 and lateral short dimension 115 of first integrator 107, and a long edge 501 of second integrator 117. It is appreciated from FIG. 5 that second integrator 117 is rotated with respect to first integrator 107 by the same given angle θ1 as occurs between tilt axis 103 of micromirrors and long edge 104 of DMD 101 (i.e., in specific non-limiting implementations, about) 45°, such that given angle θ1 is also between respective long edge 104 and lateral long dimension 113 (i.e. the fast f-number direction of first integrator 107 is at given angle θ1 to respective long edge 104). In other words, while second integrator 117 is aligned with DMD 101, with long and short edges of second integrator 117 generally aligned with corresponding long and short edges of DMD 101, lateral long dimension 113 of first integrator 107, in these implementations, is generally aligned with tilt axis 103, and lateral short dimension 115 is at a non-zero angle to tilt axis 103, in these implementations about 90°.

Figure 6:
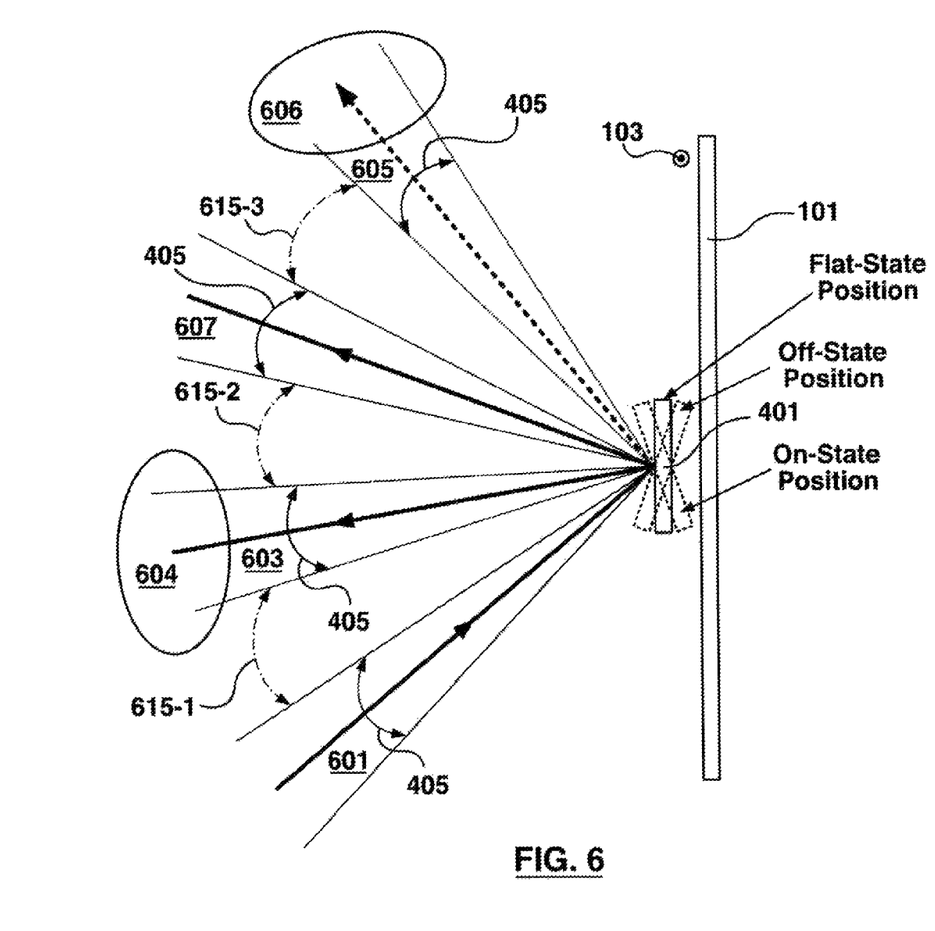
FIG. 6 depicts a side view of the DMD of FIG. 1, showing an on-state position, flat-state position and an off-state position of an example micromirror, along with an illumination path and reflection paths, as well as dead-zones there between, according to non-limiting implementations.

Attention is next directed to FIG. 6 which depicts a top view DMD 101 and an example micromirror 401 in the on-state position, the off-state position and the flat state, three positions, an on-state position (solid lines) and an off-state position (broken lines). It is further appreciated that micromirror 401, and indeed each of micromirrors, is enabled to: pivot between the on-state position, the flat state and the off-state position (i.e. along tilt axis 103, which is appreciated to be coming "out of the page").

In any event, FIG. 6 further depicts an illumination path 601 of illumination light in angle space (e.g. corresponding to light path 131 described above), in longitudinal cross-section along a slow-f-number direction 405: illumination path 601 in angle space corresponds to the short f-number direction of the ovals depicted in FIG. 1. In other words, illumination path 601 generally comprises a cone with an oval lateral cross-section and a triangular longitudinal cross-section, as can be further appreciated from FIG. 7, described below. Further, the spread of the cone along the slow f-number direction 405 is represented by illumination path 601 being triangular in cross-section, as depicted.

In any event, when micromirror 401 is in the on-state position, the light along illumination path 601 is reflected along reflection path 603 (with a same slow f-number direction 405 as illumination path 601) according to angle-of-incidence (AOI) equals angle-of-reflection (AOR), to projection optics 604. Projection optics 604 can include, but is not limited to, a lens system, prisms, a projection lens and the like, enabled to project an image formed by DMD 101 onto a screen.

Similarly, when micromirror 401 is in the off-state position, the light along illumination path 601 is reflected along reflection path 605 (with a same slow f-number direction 405 as illumination path 601) according to AOI equals AOE, to light dump 606. Light dump 606 is generally enabled to absorb light received therein, hence preventing light reflected from micromirror 401, in the off-state position from reflecting within system 100 and/or entering projection optics and/or entering at least one optical component 127. In other words, system 100 can further comprise light dump 606.

Similarly, when micromirror 401 is in the flat state, the light along illumination path 601 is reflected along reflection path 607 (with a same slow f-number direction 405 as illumination path 601) according to AOI equals AOR, to another light dump (not depicted) and/or light dump 606, and the like.

Further, a centre path of each of paths 601, 603, 605, 607 is depicted in heavier lines than the outer edges of the cross-section of respective cones.

It is yet further appreciated that DMD 101 is generally enabled to form an image using the micromirrors, each micromirror corresponding to a pixel in the image: when a micromirror is an on-state position, the corresponding pixel is also on and hence illumination light is reflected to projection optics 604 along path 603, and when a micromirror is in on off-state position, the corresponding pixel is also off and hence illumination light is reflected away from projection optics 604, and specifically to light dump 606 so that illumination light is absorbed and does not scatter within system 100.

It is further appreciated that illumination light, along light path 131, is reflected from micromirror 401 according to angle of incidence equals angle of reflection in each of the on-state position, the flat-state position, and the off-state position. In specific non-limiting implementations, micromirror 401 pivots between about +/−12° off normal of DMD 101, and hence pivots over about a 24° range. Taking into account the angle of DMD 101 of about 24°, in these implementations, an angle between a centre of path 601 and a centre of path 603 is about 242°, while an angle between centre a centre of path 601 and a centre of path 605 is about 72°. Similarly, an angle between a centre of path 601 and a centre of path 607 is about 48°.

It is further appreciated that, located between adjacent ones of each of illumination path 601 and reflection paths 603, 605, 607, are dead-zones 615-1, 615-2, 615-3, where it is desired that no light be present in order to reduce the chance that light reflected from micro-mirror in the off-state position and/or flat-state position be scattered into at least one optical component 127 and/or that light reflected from micromirror 401 in the on-state position be scattered back through at least one optical component 127. It is appreciated that dead-zone 615-1 is between proximal edges of paths 601, 603, dead-zone 615-2 is between paths 603, 607, and dead-zone 615-3 is between paths 607, 605. In particular, it is preferable that dead-zones 615-1, 615-2 be as wide as possible to reduce the chance of scatter in system 100.

Figure 7:
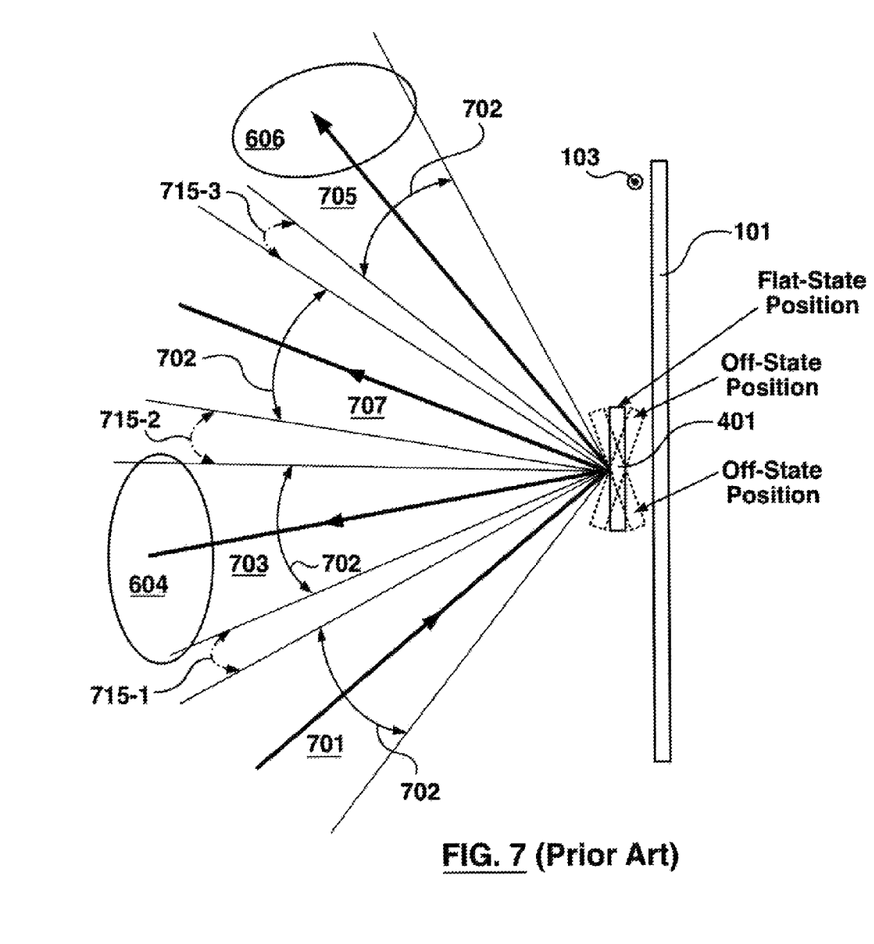
FIG. 7 depicts a side view of the DMD of FIG. 1, when used in a prior art illumination system.

For example, in contrast to FIG. 6, attention is next directed to FIG. 7 which shows the prior art, when the illumination light symmetric (and/or not shaped in angle space into light having an asymmetric f-number profile). In other words, the cones of illumination light have a circular cross-section, with a uniform f-number similar to the f-number in fast f-number direction of present implementations. Hence, depicted in FIG. 7 is DMD 101 comprising example micromirror 401 which pivots along tilt axis 103 as described above; however, in these implementations, DMD 101 is being used in a prior art illumination system. An illumination path 701, comprising an f-number direction 702, similar to f-number direction 405, but faster (i.e. a smaller f-number), is reflected as follows: along path 703 when micromirror 401 is in the on-state position; along path 705 when micromirror 401 when micromirror 401 is in the off-state position; and along path 707 when micromirror 401 is in the flat-state position. However, dead-zones 715-1, 715-2, 715-3, corresponding to dead-zones 615-1, 615-2, 615-3, are smaller than dead-zones 615-1, 615-2, 615-3 due the faster f-number (i.e. smaller f-number) of dead-zones paths 601, 603, 605, 607 as compared to dead-zones 701, 703, 705, 707.

Dead-zones 615-1, 615-2, 615-3 will interchangeably hereafter be referred to, collectively, as dead-zones 615, and generically as a dead-zone 615. Similarly, dead-zones 715-1, 715-2, 715-3 will hereafter be referred to interchangeably, collectively, as dead-zones 715, and generically as a dead-zone 715.

Figure 8:
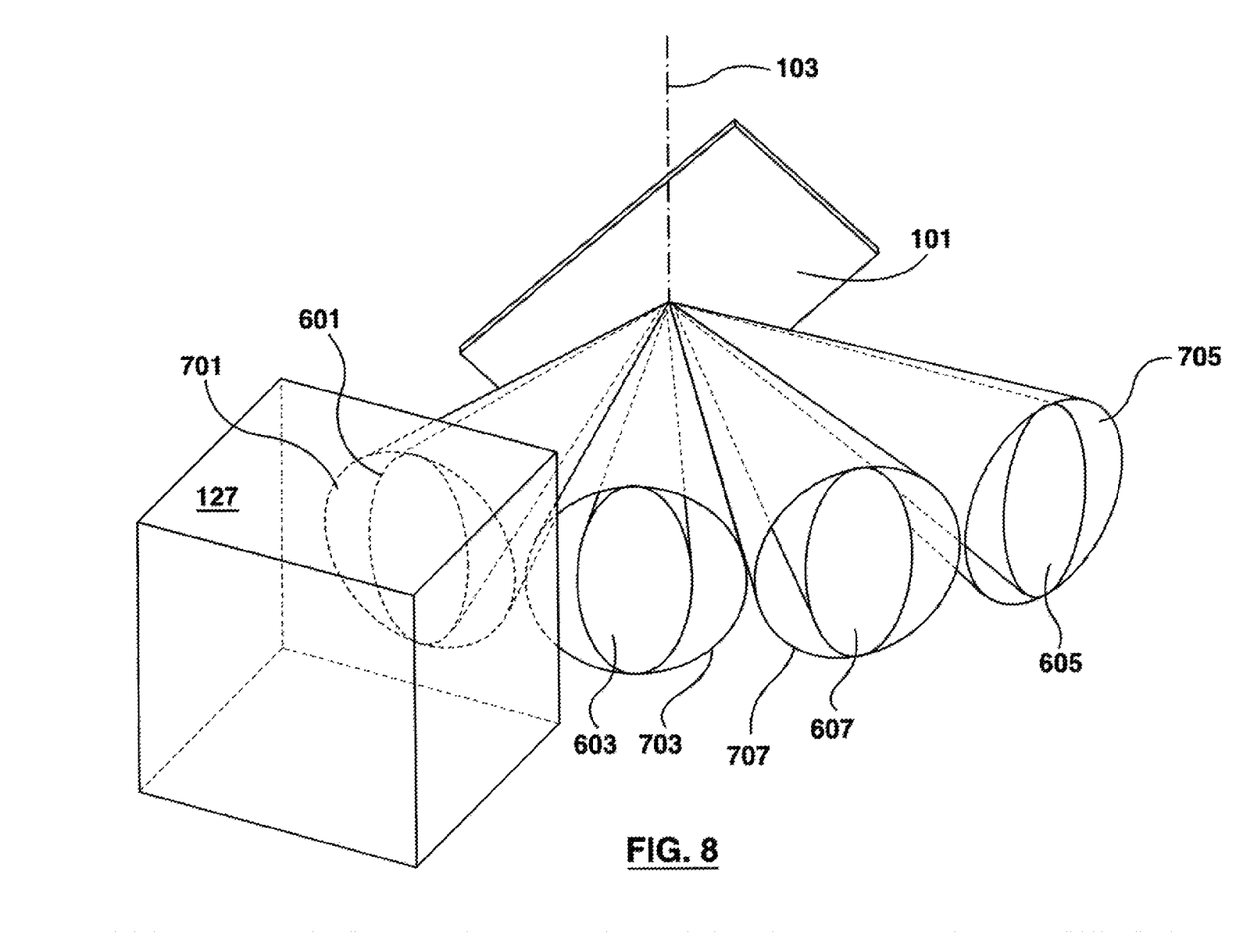
FIG. 8 depicts a perspective view of the DMD of FIG. 1, showing an illumination path and reflection paths, as well as illumination paths and reflection paths of the prior art, according to non-limiting implementations.

Attention is next directed to FIG. 8 which shows a perspective view of paths 601, 603, 605, 607 in angle space and a perspective view of DMD 101 and an illumination end of at least one optical component 127 in physical space. Also depicted is a perspective view of paths 701, 703, 705, 707 in angle space overlaid on paths 601, 603, 605, 607. It is appreciated that at least one optical component 127 is depicted as transparent so that paths 601, 701, 603, 703 are visible. While the remaining elements of system 100 are not depicted, it is appreciated that they are nonetheless present.

In any event, FIG. 8 clearly depicts paths 601, 603, 605, 607 as being asymmetric cones with oval cross-sections the long direction of the oval (i.e. fast-f-number direction 403) being aligned with tilt axis 103, and the short direction of the oval being at about 90° to tilt axis (i.e. slow f-number direction 405). FIG. 8 further clearly depicts paths 701, 703, 705, 707 as being symmetric cones with circular cross-sections having a same f-number as the fast-f-number direction 403 of paths 601, 603, 605, 607, with paths 701, 703, 705, 707 containing paths 601, 603, 605, 607.

In other words, each of paths 601, 603, 605, 607 are narrowed along the slow f-number direction as compared to respective paths 701, 703, 705, 707; however, paths 601, 603, 605, 607 are similar to respective paths 701, 703, 705, 707 along the fast f-number direction. The overall result is to reduce the dead-zones 615 between paths 601, 603, 605, 607 as compared to dead-zones 715 between paths 701, 703, 705, 707.

In other words, dead-zones between adjacent ones of illumination path 601 of the light as it impinges on DMD 101 and reflection paths 603, 607, 605 of the light as it respectively reflects from the micromirrors in each of the on-state position, the flat-state position, and the off-state position, are increased relative to if the light were f-number symmetric when impinging on DMD 101, and of a similar f-number as the fast f-number direction.

It is further appreciated that the f-number of the fast f-number direction should be as large as possible to increase light throughput in system 100.

In some implementations, the ratio of lateral long dimension 113 to lateral short dimension 115 can be one or more of about 2:1 and less then about 2:1, however other ratios are within the scope of present implementations as long as later long dimension 113 is larger than lateral short dimension 115.

Figure 9:
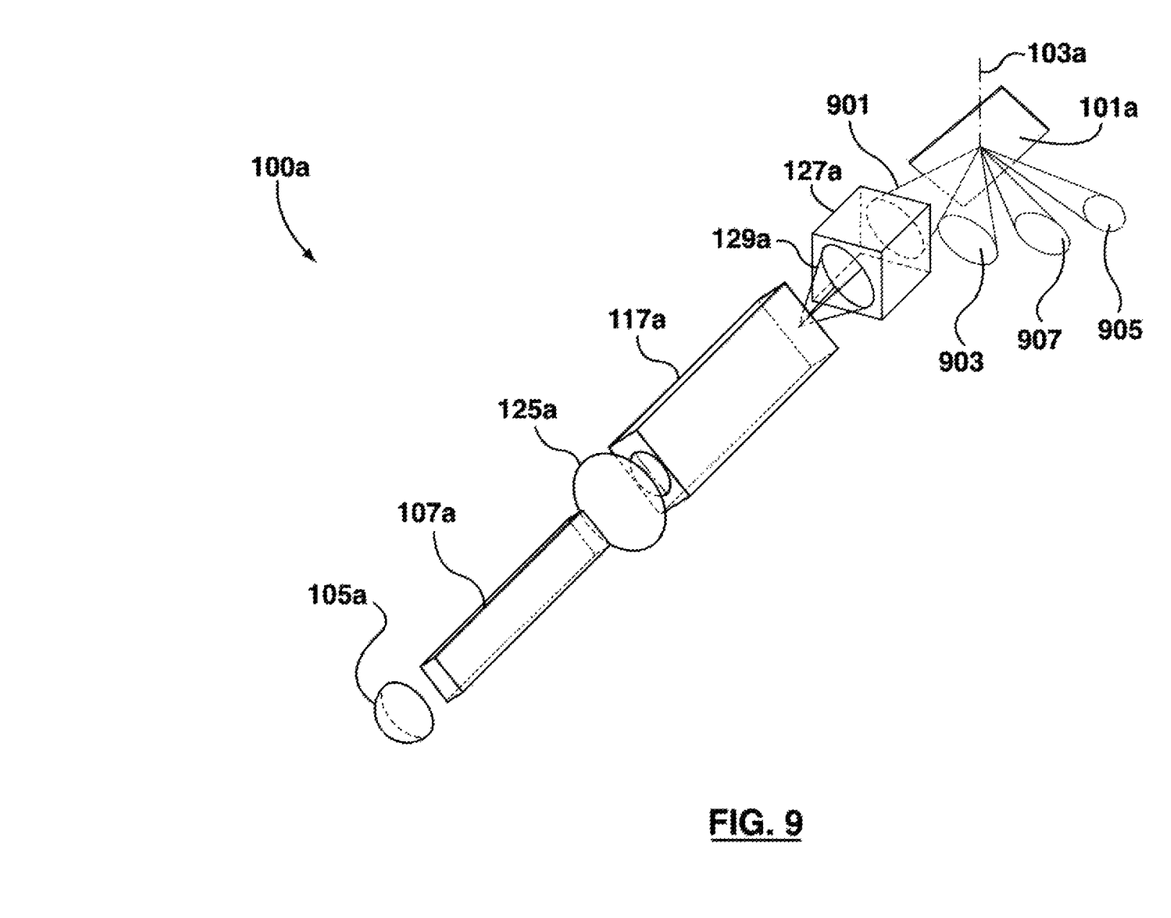
FIG. 9 depicts a perspective view of an alternative contrast enhancing system for use in a projection system, according to non-limiting implementations.

Attention is next directed to FIG. 9, which depicts an alternative contrast enhancing system 100a, according to non-limiting implementations. System 100a is substantially similar to system 100, with like elements having like numbers, and comprises a DMD 101a (comprising micromirrors (not depicted) enabled to pivot along a tilt axis 103a), a light source 105a, a first integrator 107a, a telecentric lens 125a, a second integrator 117a, an at least one optical component 127a. While various faces and dimensions, etc. of integrators 107a, 117a are not labelled, they are nonetheless appreciated to be present.

In any event, system 100a is similar to system 100 except that first integrator 107a is rotated by 45° counter clockwise (viewing first integrator 107a from light source 105a) with respect to tilt axis 103a, so that first integrator 107a is laterally aligned with both second integrator 117a, and DMD 101a. This has the effect of rotating the fast f-number direction and the slow f-number direction of light path 129a in angle space, as well as respective asymmetric cones of illumination path 901, and reflection paths 903, 905, 907 (corresponding respectively to illumination path 601, and reflection paths 603, 605, 607). In other words, a rotation of integrator 107a with respect to tilt axis 103a causes a corresponding rotation to paths 901, 903, 905, 907. It can be appreciated that if first integrator 107a were rotated such that a lateral short dimension of first integrator 107a (corresponding to a slow f-number direction of paths 901, 903, 905, 907) were aligned with tilt axis 103a (i.e. at about 0°), then the oval cross-sections of paths 901, 903, 905, 907 would be aligned laterally in their respective long directions, and the dead-zones there between would be reduced. However, when a lateral short dimension of first integrator 107a is rotated to a non-zero angle to tilt axis 103a (in these implementations about 45°) then the dead-zones increase in size.

Figure 10:
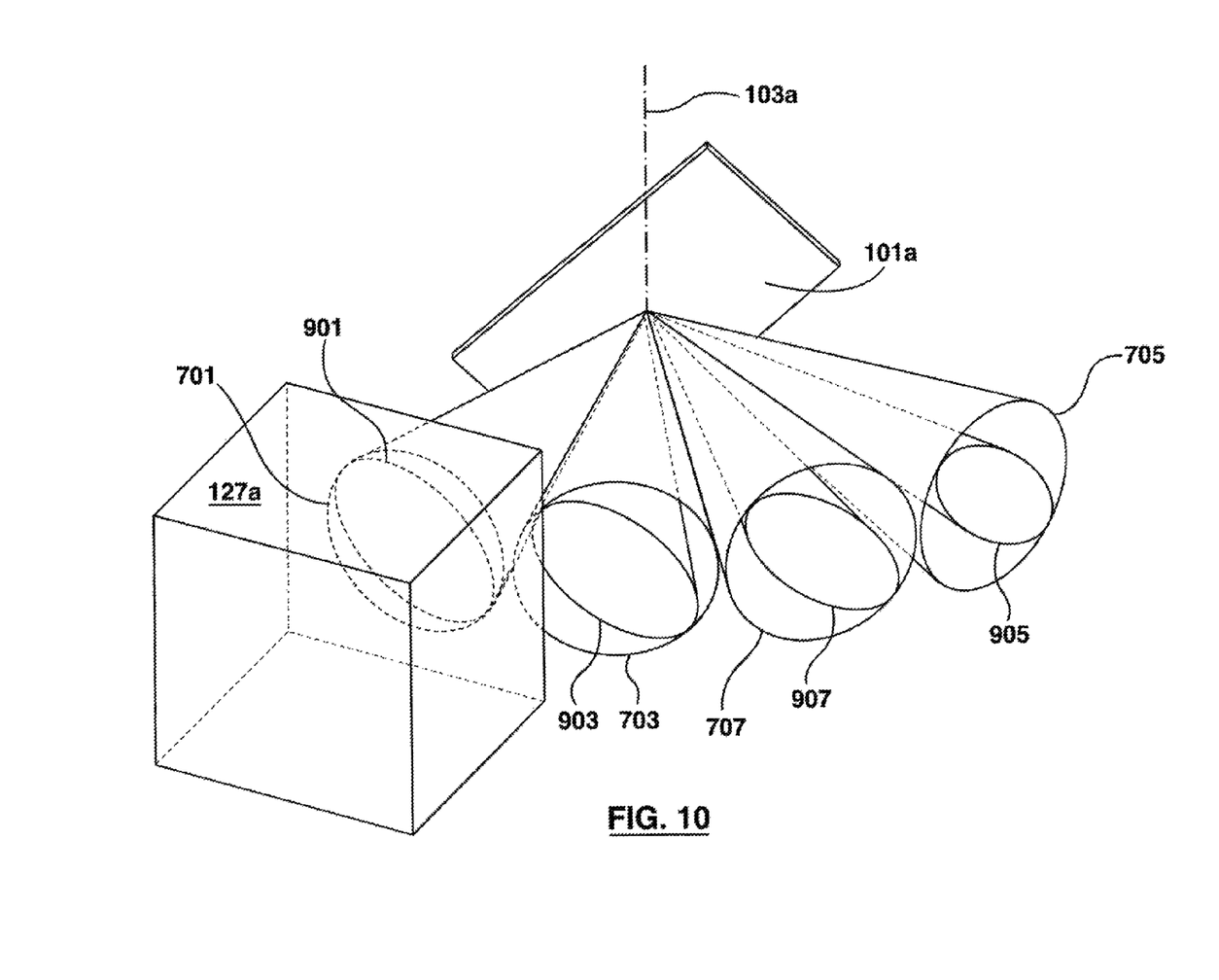
FIG. 10 depicts a perspective view of the DMD of FIG. 9, showing an illumination path and reflection paths, as well as illumination paths and reflection paths of the prior art, according to non-limiting implementations.

Attention is next directed to FIG. 10 which shows a perspective view of paths 901, 903, 905, 907 in angle space and a perspective view of DMD 101a and an illumination end of at least one optical component 127a, along with a perspective view of paths 701, 703, 705, 707 also in angle space overlaid on paths 901, 903, 905, 907. It is appreciated that at least one optical component 127a is depicted as transparent, similar to FIG. 8 so that paths 901, 701, 903, 703 are visible. While the remaining elements of system 100a are not depicted, it is appreciated that they are nonetheless present. In any event, FIG. 10 clearly depicts paths 901, 903, 905, 907 as being asymmetric cones with oval cross-sections, each of the long direction of the oval (i.e. fast f-number direction 403) and the short direction of the oval (i.e. slow f-number direction 405) at about a 45° angle to tilt axis 103a. FIG. 10 further clearly depicts paths 701, 703, 705, 707 as being symmetric cones with circular cross-sections having a same f-number as the fast-f-number direction 403 of paths 901, 903, 905, 907, with paths 701, 703, 705, 707 containing paths 901, 903, 905, 907.

In other words, each of paths 901, 903, 905, 907 are narrowed along the slow f-number direction as compared to respective paths 701, 703, 705, 707; however, paths 901, 903, 905, 907 are similar to respective paths 701, 703, 705, 707 along the fast f-number direction. The overall result is to increase the dead-zones 915 between paths 901, 903, 905, 907 as compared to dead-zones 715 between paths 701, 703, 705, 707. Indeed, it is appreciated that the dead-zones are decreased as long as the slow f-number direction of paths 901, 903, 905, 907 are at a non-zero angle to tilt axis 103a.

It is further appreciated that as integrator 107a is rotated about its longitudinal axis, paths 901, 903, 905, 907 also rotate within paths 701, 703, 705, 707 with end points of the long direction of the oval cross-sections of paths 901, 903, 905, 907 touching the edges of paths 701, 703, 705, 707. This again illustrates that the dead-zones of paths 901, 903, 905, 907 can be increased by rotating a lateral short dimension of first integrator 107a from 0° to 90° from tilt axis 103a. After 90° the dead-zones will start-to decrease until the lateral short dimension of first integrator 107a is again aligned with tilt axis 103a. Indeed, another way to interpret FIG. 7 is that each of paths 701, 703, 705 707 are also representative of the paths of the light if a lateral short dimension of first integrator 107a were at 0° to tilt axis 103a.

In other words, dead-zones between adjacent ones of illumination path 901 of the light as it impinges on DMD 101 and reflection paths 903, 907, 905 of the light as it respectively reflects from the micromirrors in each of the on-state position, the flat-state position, and the off-state position are increased relative to if the light were f-number symmetric when impinging on DMD 101, and of a similar f-number as the fast f-number direction.

In any event, by implementing the described system 100, 100a within projector systems to enhance contrast of projected images, on screen colour and brightness uniformity of a projector will be improved, as systems 100, 100a can be implemented for each colour in projectors. As a consequence, the contrast of the projector will also improve due to a wider separation of illumination light, on-state light, flat-state light and off-state light.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A contrast enhancing system comprising:
    a digital micromirror device (DMD) comprising a plurality of micromirrors and a tilt axis, the micromirrors enabled to pivot along the tilt axis between an on-state position, a flat-state position, and an off-state position;
    a light source;
    a first integrator enabled to receive light from the light source, the first integrator comprising a lateral long dimension and a lateral short dimension, the lateral short dimension at a non-zero angle to the tilt axis of the DMD;
    a second integrator enabled to receive light from the first integrator, and shape the light into a similar shape as the DMD;

a telecentric lens about midway between the first integrator and the second integrator, the telecentric lens enabled to: convey the light from the first integrator to the second integrator; and generate a fast f-number direction and a slow f-number direction of the light in angle space, the fast f-number direction and the slow f-number direction respectively corresponding to the lateral long dimension and lateral short dimension of the first integrator, the slow f-number direction correspondingly at the non-zero angle to the tilt axis, thereby increasing dead-zones between adjacent ones of an illumination path of the light as it impinges on the DMD and reflection paths of the light as it reflects from the micromirrors in each of the on-state position, the flat-state position, and the off-state position; and, at least one optical component enabled to focus the light along the illumination path from the second integrator onto the DMD.

2. The contrast enhancing system of claim 1, wherein, the lateral short dimension of the first integrator is at about 90° to the tilt axis.

3. The contrast enhancing system of claim 1, wherein the lateral short dimension is greater than or about equal to 45° to the tilt axis.

4. The contrast enhancing system of claim 1, wherein each of the micromirrors is enabled to:

reflect the light to projection optics in the on-state position; and, reflect the light to a light dump in the off-state position.

5. The contrast enhancing system of claim 1, further comprising, the light dump.

6. The contrast enhancing system of claim 1, wherein the dead-zones between adjacent ones of an illumination path of the light as it impinges on the DMD and reflection paths of the light as it reflects from the micromirrors in each of the on-state position, the flat-state position, and the off-state position are increased relative to if the light were f-number symmetric when impinging on the DMD.

7. The contrast enhancing system of claim 1, wherein a cross-section of the first integrator is one of rectangular shaped, rounded rectangular shaped, oval shaped, and elliptically shaped.

8. The contrast enhancing system of claim 1, wherein each of an exit face of the first integrator and an entrance face of the second integrator are located at respective focal points of the telecentric lens, each of the respective focal points located on opposite sides of the telecentric lens.

9. The contrast enhancing system of claim 1, further comprising a given angle between the tilt axis of the micromirrors and a given edge of the DMD, and the first integrator is rotated with respect to the second integrator by the given angle, such that the given angle is also between the fast axis of the first integrator and an edge of the second integrator aligned with the given edge of the DMD.

10. The contrast enhancing system of claim 1, wherein the telecentric lens is further enabled to convey the light from the first integrator to the second integrator such that the light is contained within boundaries of an entrance face of the second integrator.

11. The contrast enhancing system of claim 1, wherein each of the first integrator and the second integrator comprises one or more of a solid integrator rod and a hollow integrator rod.

12. The contrast enhancing system of claim 1, wherein the at least one optical component comprises one or more of a prism, a lens, a prism system, a lens system.

13. The contrast enhancing system of claim 1, wherein one or more of entrance faces and exit faces of the first integrator and the second integrator, the telecentric lens, and optical surfaces in the at least one optical component comprise respective anti-reflective coatings.

* * * * *